United States Patent
Seok

(10) Patent No.: US 10,028,272 B2
(45) Date of Patent: Jul. 17, 2018

(54) METHOD AND APPARATUS FOR EXCHANGING FRAME FOR A LOW-POWER DEVICE IN A WIRELESS LOCAL AREA NETWORK (WLAN) SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 14/769,082

(22) PCT Filed: Oct. 13, 2013

(86) PCT No.: PCT/KR2013/009728
§ 371 (c)(1),
(2) Date: Aug. 19, 2015

(87) PCT Pub. No.: WO2014/129723
PCT Pub. Date: Aug. 28, 2014

(65) Prior Publication Data
US 2016/0014773 A1 Jan. 14, 2016

Related U.S. Application Data

(60) Provisional application No. 61/768,516, filed on Feb. 24, 2013, provisional application No. 61/773,793, filed on Mar. 6, 2013.

(51) Int. Cl.
*H04W 72/04* (2009.01)
*H04W 74/08* (2009.01)
(Continued)

(52) U.S. Cl.
CPC ..... *H04W 72/0446* (2013.01); *H04W 40/244* (2013.01); *H04W 52/0216* (2013.01);
(Continued)

(58) Field of Classification Search
CPC ............ H04W 52/02; H04W 52/0216; H04W 52/0219; H04W 56/00; H04W 74/08;
(Continued)

(56) References Cited

U.S. PATENT DOCUMENTS 7,668,128 B1 * 2/2010 Benveniste ........... H04W 28/18
370/252
2005/0136914 A1 * 6/2005 van Kampen .... H04W 52/0216
455/426.2

(Continued)

FOREIGN PATENT DOCUMENTS

CN 101087172 12/2007
CN 101964735 2/2011
(Continued)

OTHER PUBLICATIONS

Wu, et al., "An Energy Efficient MAC Protocol for IEEE 802.11 WLANs," Proceedings of the Second Annual Conference on Communication Networks and Services Research, IEEE, May 2004, 9 pages.
(Continued)

*Primary Examiner* — Mewale Ambaye
(74) *Attorney, Agent, or Firm* — Lee Hong Degerman Kang Waimey

(57) ABSTRACT

The present invention relates to a wireless communication system, and more particularly to a method for exchanging a frame for a low power device and an apparatus therefor in a wireless LAN system. A method for enabling an access point (AP) to exchange a frame with a station (STA) in a wireless LAN system according to an embodiment of the present invention includes the steps of receiving the information of the maximum awake time from the STA. When the frame exchange is expected to be accomplished within the maximum awake time, the frame exchange can be performed. When the frame exchange is expected to exceed
(Continued)

the maximum awake time, the frame exchange is stopped, and a new back-off procedure can be invoked.

9 Claims, 15 Drawing Sheets

(51) Int. Cl.
    *H04W 52/02*     (2009.01)
    *H04W 40/24*     (2009.01)
    *H04W 74/06*     (2009.01)
    *H04W 76/38*     (2018.01)
    *H04W 84/12*     (2009.01)
    *H04W 88/02*     (2009.01)
    *H04W 88/08*     (2009.01)

(52) U.S. Cl.
    CPC ........... *H04W 74/06* (2013.01); *H04W 74/08* (2013.01); *H04W 76/38* (2018.02); *H04W 84/12* (2013.01); *H04W 88/02* (2013.01); *H04W 88/08* (2013.01); *Y02D 70/00* (2018.01); *Y02D 70/1222* (2018.01); *Y02D 70/1224* (2018.01); *Y02D 70/1262* (2018.01); *Y02D 70/1264* (2018.01); *Y02D 70/142* (2018.01); *Y02D 70/146* (2018.01); *Y02D 70/168* (2018.01); *Y02D 70/21* (2018.01); *Y02D 70/22* (2018.01)

(58) Field of Classification Search
    CPC ... H04W 74/06; H04W 76/068; H04W 84/12; H04W 88/02
    See application file for complete search history.

(56) References Cited

U.S. PATENT DOCUMENTS

| | | | |
|---|---|---|---|
| 2007/0287456 A1* | 12/2007 | Shimizu | H04W 52/0251 455/435.1 |
| 2011/0122780 A1* | 5/2011 | Nieminen | H04W 52/0232 370/252 |
| 2013/0229963 A1* | 9/2013 | Asterjadhi | H04W 28/044 370/311 |
| 2014/0003310 A1* | 1/2014 | Kamath | G01S 1/20 370/311 |

FOREIGN PATENT DOCUMENTS

| | | |
|---|---|---|
| JP | 2007329696 | 12/2007 |
| JP | 2008544704 | 12/2008 |
| KR | 10-2011-0009208 | 1/2011 |
| WO | 2012096549 | 7/2012 |
| WO | 2013008989 | 1/2013 |
| WO | 2013019225 | 2/2013 |

OTHER PUBLICATIONS

PCT International Application No. PCT/KR2013/009728, Written Opinion of the International Searching Authority dated Jan. 24, 2014, 15 pages.

European Patent Office Application Serial No. 13875838.8, Search Report dated Aug. 17, 2016, 7 pages.

State Intellectual Property Office of the People's Republic of China Application Serial No. 201380075065.6, Office Action dated Dec. 8, 2017, 7 pages.

\* cited by examiner

FIG. 18
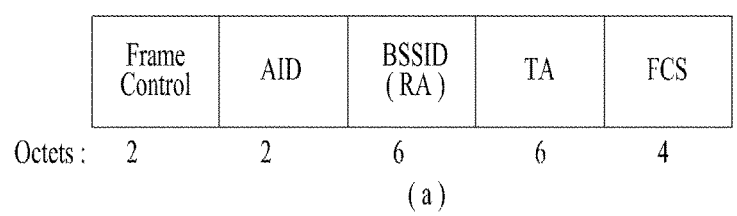
(a)
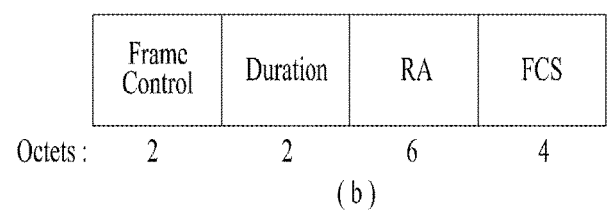
(b)
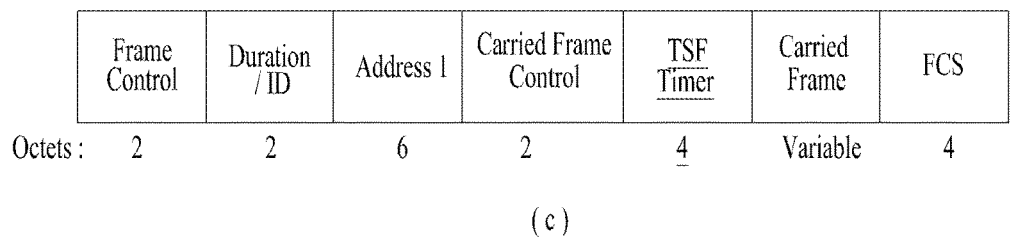
(c)

METHOD AND APPARATUS FOR EXCHANGING FRAME FOR A LOW-POWER DEVICE IN A WIRELESS LOCAL AREA NETWORK (WLAN) SYSTEM

CROSS-REFERENCE TO RELATED APPLICATIONS

This application is the National Stage filing under 35 U.S.C. 371 of International Application No. PCT/KR2013/009728, filed on Oct. 30, 2013, which claims the benefit of U.S. Provisional Application No. 61/768,516, filed on Feb. 24, 2013 and 61/773,793, filed on Mar. 6, 2013, the contents of which are all hereby incorporated by reference herein in their entirety.

TECHNICAL FIELD

The present invention relates to a wireless communication system, and more particularly to a method and apparatus for exchanging a frame for a low-power device in a wireless LAN (WLAN) system.

BACKGROUND ART

Various wireless communication technologies have been developed with rapid development of information technology. WLAN technology from among wireless communication technologies allows wireless Internet access at home, in enterprises or in a specific service provision region using mobile terminals, such as a Personal Digital Assistant (PDA), a laptop computer, a Portable Multimedia Player (PMP), etc. on the basis of Radio Frequency (RF) technology.

In order to overcome limited communication speed, one of the disadvantages of WLAN, recent technical standards have proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input Multiple Output (MIMO) technology has recently been applied to both a transmitter and a receiver so as to minimize transmission errors as well as to optimize a data transfer rate.

DISCLOSURE

Technical Problem

Machine-to-Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

An object of the present invention is to provide a method for efficiently and correctly performing frame exchange when transmission/reception (Tx/Rx) operations of a low-power device are limited in a manner that the Tx/Rx operations can be performed only in a specific time interval. Another object of the present invention is to provide a method for efficiently performing time synchronization between devices configured to perform frame exchange.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for allowing an access point (AP) to perform frame exchange with a station (STA) in a wireless LAN (WLAN) system including: receiving information regarding a maximum awake time from the station (STA); if it is expected that the frame exchange will be completed within the maximum awake time, performing the frame exchange; and if it is expected that the frame exchange will exceed the maximum awake time, stopping the frame exchange, and performing a new backoff process.

The AP may assume that the maximum awake time starts from a specific time at which the access point (AP) receives a PS (Power Save)-Poll frame from the station (STA).

The information regarding the maximum awake time may be received from the station (STA) by the access point (AP) through a probe request frame, an association request frame, or a reassociation request frame.

The station (STA) may be an energy limited station (STA).

The frame exchange may include: transmitting the PS-Poll frame from the station (STA) to the access point (AP); and transmitting an ACK frame from the access point (AP) to the station (STA).

The PS-Poll frame may include indication information indicating that information regarding some bytes of a Time Synchronization Function (TSF) timer is requested.

The ACK frame may include information regarding some bytes of the TSF timer of the access point (AP).

The some bytes of the TSF timer may be a predetermined number of lower bytes of the TSF timer of the access point (AP).

The PS-Poll frame may be transmitted when the station (STA) awakes.

The PS-Poll frame may be transmitted on the condition that the station (STA) does not listen to a beacon.

In accordance with another aspect of the present invention, a method for allowing a station (STA) to perform frame exchange with an access point (AP) in a wireless LAN (WLAN) system includes: transmitting information regarding a maximum awake time to the access point (AP); if it is expected that the frame exchange will be completed within the maximum awake time, performing the frame exchange; and if it is expected that the frame exchange will exceed the maximum awake time, stopping the frame exchange, and performing a new backoff process.

In accordance with another aspect of the present invention, an access point (AP) for performing frame exchange with a station (STA) in a wireless LAN (WLAN) system includes: a transceiver; and a processor. The processor controls the transceiver to receive information regarding a maximum awake time from the station (STA); if it is expected that the frame exchange will be completed within the maximum awake time, performs the frame exchange; and if it is expected that the frame exchange will exceed the maximum awake time, stops the frame exchange, and performs a new backoff process.

In accordance with another aspect of the present invention, a station (STA) for performing frame exchange with an access point (AP) in a wireless LAN (WLAN) system includes: a transceiver; and a processor. The processor controls the transceiver to transmit information regarding a maximum awake time to the access point (AP); if it is expected that the frame exchange will be completed within the maximum awake time, performs the frame exchange; and if it is expected that the frame exchange will exceed the maximum awake time, stops the frame exchange, and performs a new backoff process.

The following items can be commonly applied to the embodiments of the present invention.

It is to be understood that both the foregoing general description and the following detailed description of the present invention are exemplary and explanatory and are intended to provide further explanation of the invention as claimed.

Advantageous Effects

As is apparent from the above description, the embodiments of the present invention can provide a method and apparatus for efficiently and correctly performing frame exchange when transmission/reception (Tx/Rx) operations of a low-power device are limited in a manner that the Tx/Rx operations can be performed only in a specific time interval. In addition, the embodiments of the present invention can provide a method and apparatus for efficiently performing time synchronization between devices configured to perform frame exchange.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 18 is a conceptual diagram illustrating exemplary formats of a PS-Poll frame and an ACK frame according to an embodiment of the present invention.

BEST MODE

Figure 1:
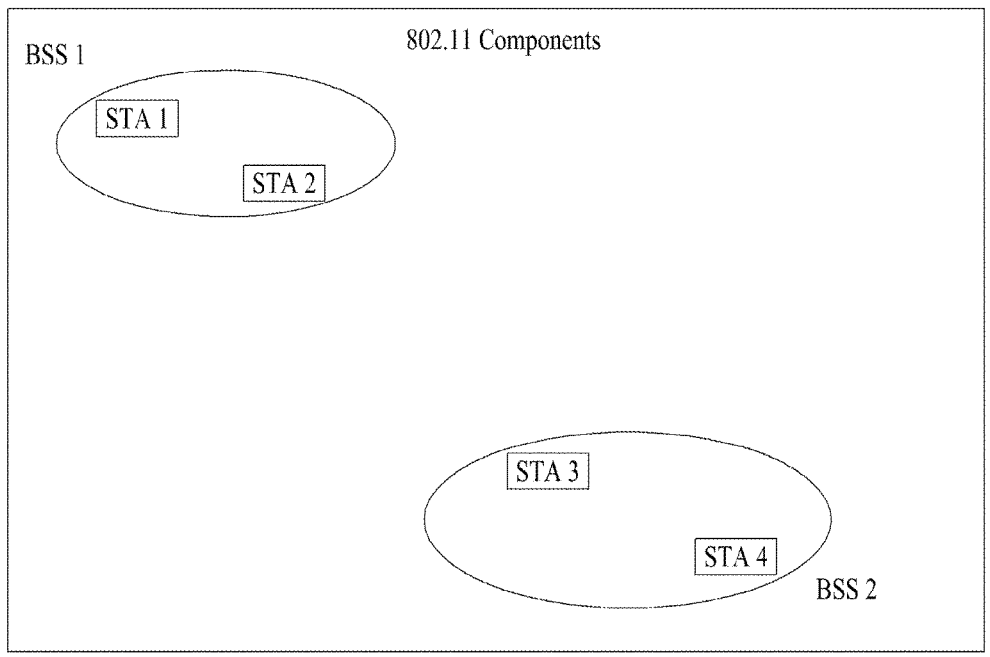
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
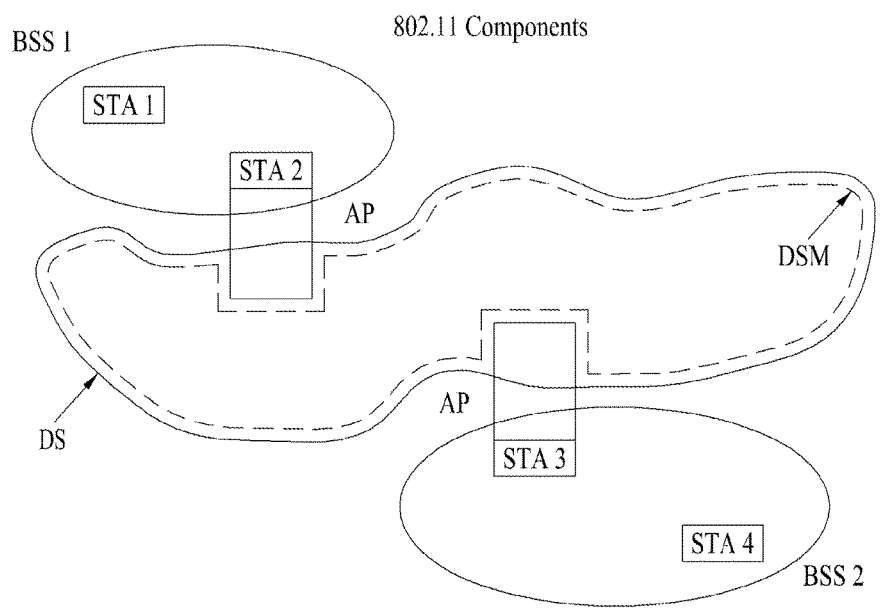
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
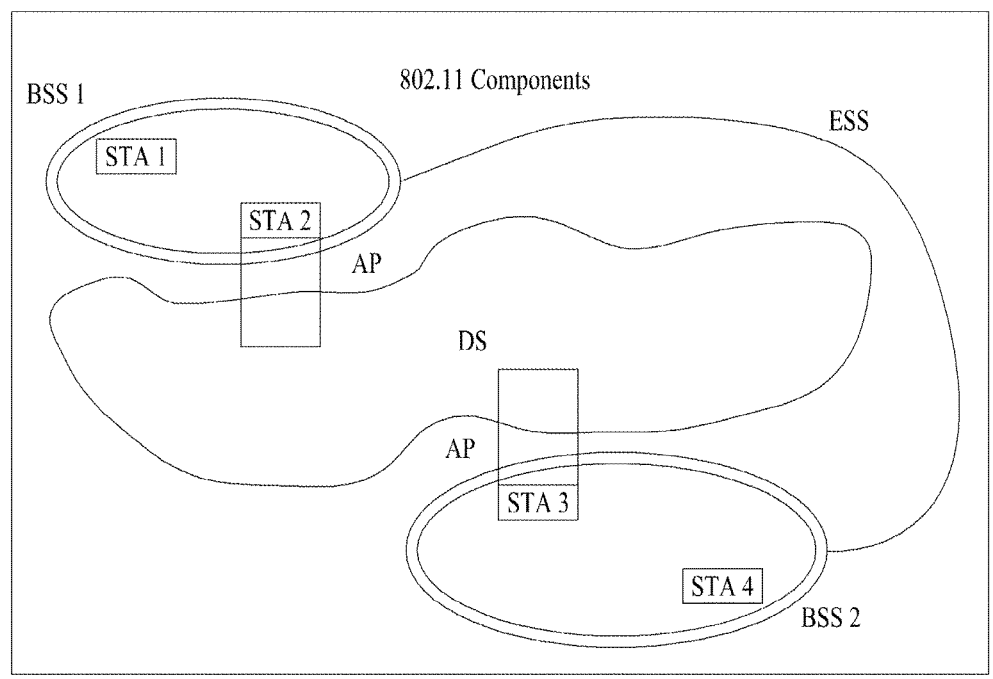
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
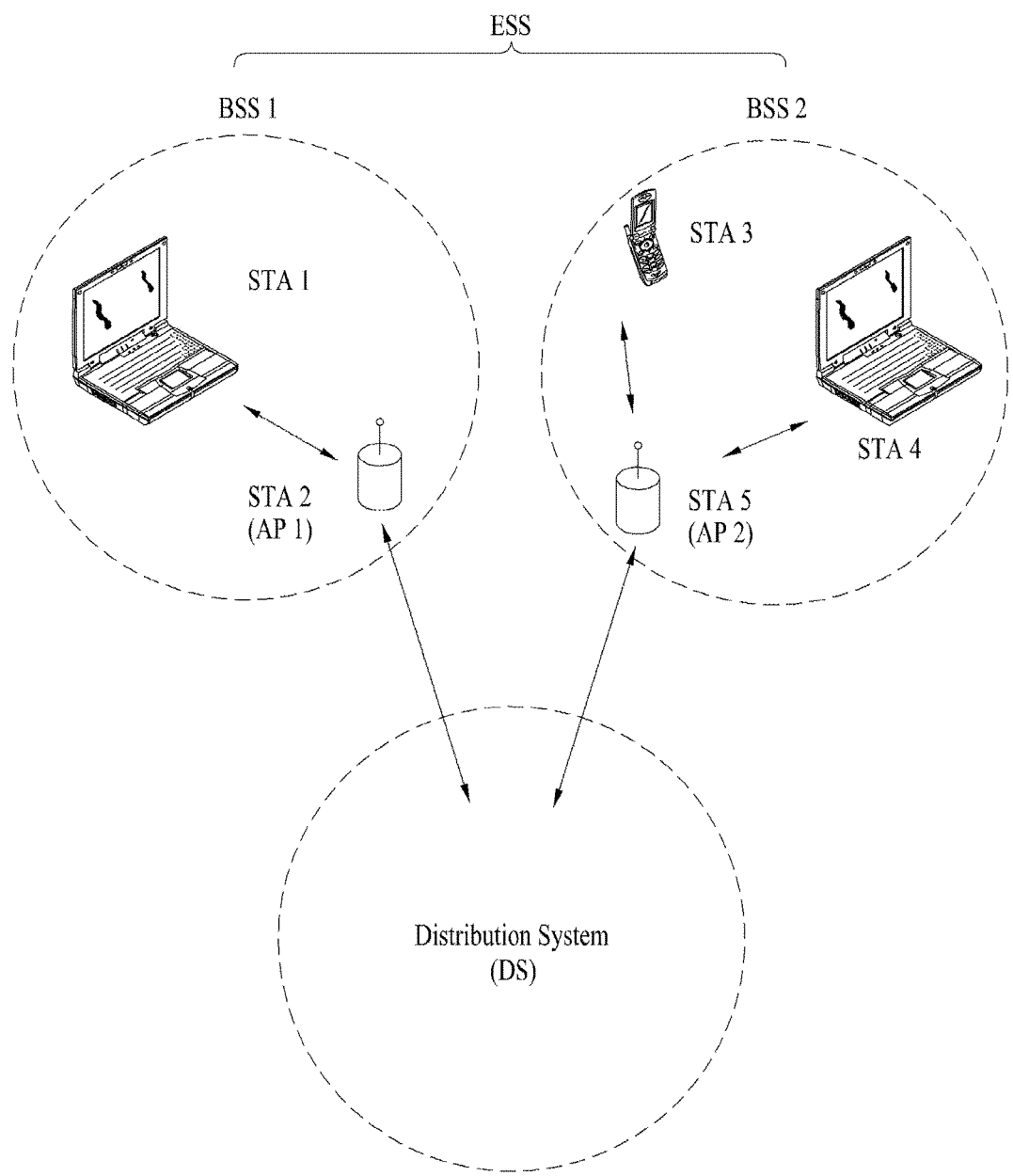
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Architecture

In the WLAN system, an operation of an AP and/or an STA may be described from the perspective of layer architecture. Layer architecture in terms of device configuration may be implemented by a processor. The AP or the STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each AP/STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. An XX-GET.request primitive is used to request the value of a given MIB attribute (management information-based attribute information). An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Link Setup Process

Figure 5:
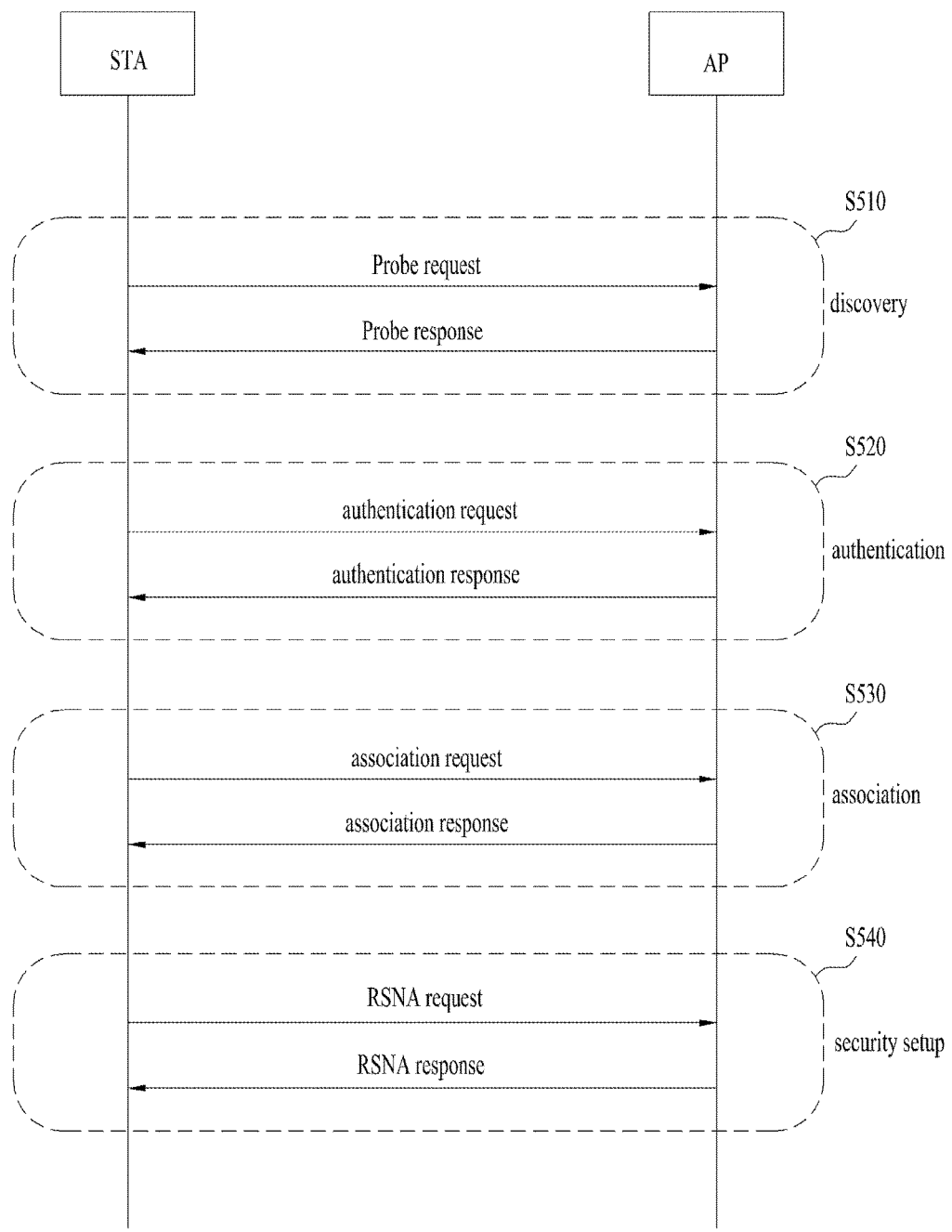
FIG. 5 is a flowchart illustrating a link setup process for use in the WLAN system.

FIG. 5 is a flowchart illustrating a general link setup process.

In order to allow an STA to set up a link with a network and transmit/receive data to/from the network, the STA should perform network discovery, authentication, association, and authentication for security. The link setup process may also be referred to as a session initiation process or a session setup process. In addition, discovery, authentication, association, and security setup steps of the link setup process may be generically referred to as an association process.

An exemplary link setup process will be described with reference to FIG. 5.

In step S510, the STA may perform network discovery. The network discovery may include scanning of the STA. That is, the STA should search for an available network so as to access the network. The STA should identify a compatible network before joining in a wireless network. The process for identifying a network in a specific region is referred to as scanning.

Scanning is classified into active scanning and passive scanning.

FIG. 5 illustrates a network discovery operation including active scanning. In the case of active scanning, the STA transmits a probe request frame and waits for a response to the probe request frame, while changing channels in order to determine an AP present around the STA. A responder transmits a probe response frame as a response to the probe request frame to the STA that has transmitted the probe request frame. The responder may be an STA that has finally transmitted a beacon frame in a BSS of the scanned channel. In a BSS, since an AP transmits a beacon frame, the AP is a responder. In a BSS, since STAs of the IBSS sequentially transmit beacon frames, the responder is not constant. For example, the STA, which has transmitted a probe request frame on Channel #1 and has received a probe response frame on Channel #1, may store BSS-related information included in the received probe response frame, move to the next channel (for example, Channel #2), and perform scanning on the next channel in the same manner (i.e., probe request/response transmission/reception on Channel #2).

Although not illustrated in FIG. 5, the scanning operation may also be carried out by passive scanning. An STA that performs passive scanning waits for a beacon frame, while moving from one channel to another channel. The beacon frame is one of management frames in IEEE 802.11, indicates the presence of a wireless network, enables the STA performing scanning to search for the wireless network, and is periodically transmitted in such a manner that the STA may join in the wireless network. In a BSS, an AP periodically transmits a beacon frame. In an IBSS, STAs of the IBSS sequentially transmit beacon frames. Upon receipt of a beacon frame during scanning, an STA stores BSS information included in the beacon frame, moves to another channel, and records beacon frame information for each channel. Upon receipt of a beacon frame, an STA stores BSS-related information included in the received beacon frame, moves to the next channel, and performs scanning on the next channel in the same manner.

In comparison between active scanning and passive scanning, active scanning advantageously has a shorter delay and less power consumption than passive scanning.

After the STA discovers the network, the STA may perform an authentication process in step S520. The authentication process may be referred to as a first authentication process to clearly distinguish the authentication process from a security setup process of step S540.

The authentication process may include transmission of an authentication request frame to an AP by the STA, and transmission of an authentication response frame to the STA by the AP in response to the authentication request frame. The authentication frame used for an authentication request/response may be a management frame.

An authentication frame may include an authentication algorithm number, an authentication transaction sequence number, a status code, challenge text, a Robust Security Network (RSN), a Finite Cyclic Group (FCG), etc. The above-mentioned information included in the authentication request/response frame may be an example of part of information that may be included in the authentication request/response frame, may be replaced with other information, or may include additional information.

The STA may transmit the authentication request frame to the AP. The AP may determine whether to authenticate the STA based on information included in the received authentication request frame. The AP may provide the result of the authentication process to the STA in the authentication response frame.

After the STA is successfully authenticated, the association process may be carried out in step S530. The association process may involve transmitting an association request frame to the AP by the STA, and transmitting an association response frame to the STA by the AP in response to the association request frame.

For example, the association request frame may include information related to various capabilities, a beacon listen interval, a Service Set Identifier (SSID), supported rates, supported channels, an RSN, a mobility domain, supported operating classes, a Traffic Indication Map (TIM) broadcast request, interworking service capability, etc.

For example, the association response frame may include information related to various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information may be an example of part of information that may be included in the association request/response frame, may be replaced with other information, or may include additional information.

After the STA is successfully associated with the network, a security setup process may be carried out in step S540. The security setup process of step S540 may be referred to as an authentication process based on a Robust Security Network Association (RSNA) request/response. The authentication process of step S520 may be referred to as the first authentication process, and the security setup process of step S540 may also be simply referred to as an authentication process.

For example, the security setup process of step S540 may include a private key setup process through 4-way handshaking based on an (Extensible Authentication Protocol over LAN (EAPOL) frame. In addition, the security setup process may also be carried out in a security scheme that has not been defined in the IEEE 802.11 standards.

WLAN Evolution

In order to overcome limitations in WLAN communication speed, IEEE 802.11n has recently been established as a technology standard. IEEE 802.11n aims to increase network speed and reliability and extend the coverage of the wireless network. More specifically, IEEE 802.11n supports a High Throughput (HT) of up to 540 Mbps and is based on Multiple Input Multiple Output (MIMO) using multiple antennas at both a transmitter and a receiver in order to minimize transmission errors and optimize data rates.

With the widespread use of WLAN technology and diversification of WLAN applications, there is a need to develop a new WLAN system capable of supporting a higher throughput than a data processing speed supported by IEEE 802.11n. A next-generation WLAN system supporting Very High Throughput (VHT) is the next version (i.e., IEEE 802.11ac) of the IEEE 802.11n WLAN system, and is one of IEEE 802.11 WLAN systems recently proposed to support a data process speed of 1 Gbps or more at a MAC Service Access Point (SAP).

In order to efficiently utilize a radio channel, the next-generation WLAN system supports Multi-User Multiple Input Multiple Output (MU-MIMO) transmission in which a plurality of STAs may simultaneously access a channel. In MU-MIMO transmission, the AP may simultaneously transmit a packet to at least one MIMO-paired STA.

In addition, supporting of WLAN system operations in whitespace is under discussion. For example, the introduction of the WLAN system in whitespace (TV WS) such as a frequency band (for example, ranging from 54 MHz to 698 MHz) because that becomes idle due to the transition from analog TV to digital TV has been discussed as the IEEE 802.11af standard. However, this is purely exemplary and the whitespace may be a licensed band that a licensed user may primarily use. The licensed user may be a user who has authority to use the licensed band, and may also be referred to as a licensed device, a primary user, an incumbent user, or the like.

For example, an AP and/or STA operating in the WhiteSpace (WS) should provide a function for protecting the licensed user. For example, if the licensed user such as a microphone has already used a specific WS channel that is a frequency band regulated to have a specific bandwidth in the WS band, the AP and/or STA may not use the frequency band corresponding to the WS channel so as to protect the licensed user. In addition, the AP and/or STA should discontinue using the frequency band, if the licensed user uses a frequency band used for transmission and/or reception of a current frame.

Therefore, the AP and/or STA should determine whether a specific frequency band of the WS band is available. In other words, the AP and/or STA should determine the presence or absence of a licensed user in the frequency band. Determination as to the presence or absence of the licensed user in a specific frequency band is referred to as spectrum sensing. An energy detection scheme, a signature detection scheme, and the like are used as the spectrum sensing mechanism. If the strength of a received signal is equal to or larger than a predetermined vale, the AP and/or STA may determine that the frequency band is being used by a licensed user. If a DTV preamble is detected, the AP and/or STA may determine that the frequency band is being used by a licensed user.

Machine to Machine (M2M) communication is under discussion as a next-generation communication technology. A technical standard for supporting M2M communication has been developed as IEEE 802.11ah in the IEEE 802.11 WLAN system. M2M communication refers to a communication scheme involving one or more machines, or is also be referred to as Machine Type Communication (MTC) or Device to Device (D2D) communication. A machine refers to an entity that does not require direct handling and intervention of a user. For example, not only a meter or automatic vending machine equipped with an RF module, but also a User Equipment (UE) such as a smartphone capable of performing communication by automatically accessing the network without user intervention/handling may be an example of such machines. M2M communication may include D2D communication and communication between a device and an application server, etc. As exemplary communication between a device and an application server, communication between a vending machine and an application server, communication between a Point of Sale (POS) device and an application server, and communication between an electric meter, a gas meter or a water meter and an application server. M2M-based communication applications may include security, transportation, healthcare, etc. Considering the above-mentioned application examples, M2M communication should be able to support intermittent transmission/reception of a small amount of data at low speed under an environment including a large number of devices.

Specifically, M2M communication should be able to support a large number of STAs. Although the current WLAN system is based on the assumption that one AP is associated with up to 2007 STAs, various methods for supporting association of many more STAs (e.g., about 6000 STAs) with one AP have recently been discussed for M2M communication. In addition, it is expected that many applications supporting/requesting a low transmission rate are present in M2M communication. In order to smoothly support this, an STA may recognize the presence or absence of data to be transmitted to the STA based on a Traffic Indication Map (TIM) element in the WLAN system, and various methods for reducing the bitmap size of the TIM have recently been discussed. In addition, it is expected that there will exists traffic data having a very long transmission/reception interval in M2M communication. For example, a very small amount of data such as the amount of used electricity/gas/water needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

In order to support applications, such as M2M, Internet of Things (IoT), smart grid, etc., long range communication and low power communication are needed. For this purpose, various methods for employing a communication protocol based on 1 MHz/2 MHz/4 MHz/8 MHz/16 MHz channel bandwidths in an S1G (Sub 1 GHz) frequency band (e.g., 902~928 MHz) have been intensively researched and discussed.

As described above, the WLAN technology has been rapidly evolving, and not only the above-mentioned exemplary technologies but also other technologies such as a direct link setup, improvement of media streaming throughput, support of high-speed and/or large-scale initial session setup, and support of an extended bandwidth and operation frequency, are under development.

Medium Access Mechanism

In the IEEE 802.11 WLAN system, a basic MAC access mechanism is Carrier Sense Multiple Access with Collision Avoidance (CSMA/CA). The CSMA/CA mechanism is referred to as a Distributed Coordination Function (DCF) of IEEE 802.11 MAC, and basically includes a "Listen Before Talk" access mechanism. According to the above-mentioned access mechanism, an AP and/or an STA may perform Clear Channel Assessment (CCA) for sensing an RF channel or medium during a predetermined time interval (for example, DCF Inter-Frame Space (DIFS)), prior to data transmission. If it is determined that the medium is in an idle state, the AP and/or the STA starts frame transmission through the medium. On the other hand, if the AP and/or the STA senses the medium as occupied, the AP and/or the STA does not start its own transmission, sets a delay time (for example, a random backoff period) for medium access, and attempts to start frame transmission after waiting for the delay time. It is expected that multiple STAs will attempt to start frame transmission after waiting for different times by applying random backoff periods, thereby minimize collision.

In addition, the IEEE 802.11 MAC protocol provides a Hybrid Coordination Function (HCF). The HCF is based on a DCF and a Point Coordination Function (PCF). The PCF refers to a polling-based synchronous access scheme in which periodic polling is executed in such a manner that all receiving APs and/or STAs may receive data frames. In addition, the HCF includes Enhanced Distributed Channel Access (EDCA) and HCF Controlled Channel Access (HCCA). In EDCA, access is performed based on contention to provide a data frame to a plurality of users by a provider, whereas in HCCA, a contention-free-based channel access scheme based on a polling mechanism is used. In addition, the HCF includes a medium access mechanism for improving Quality of Service (QoS) of WLAN, and may transmit QoS data during both a Contention Period (CP) and a Contention Free Period (CFP).

Figure 6:
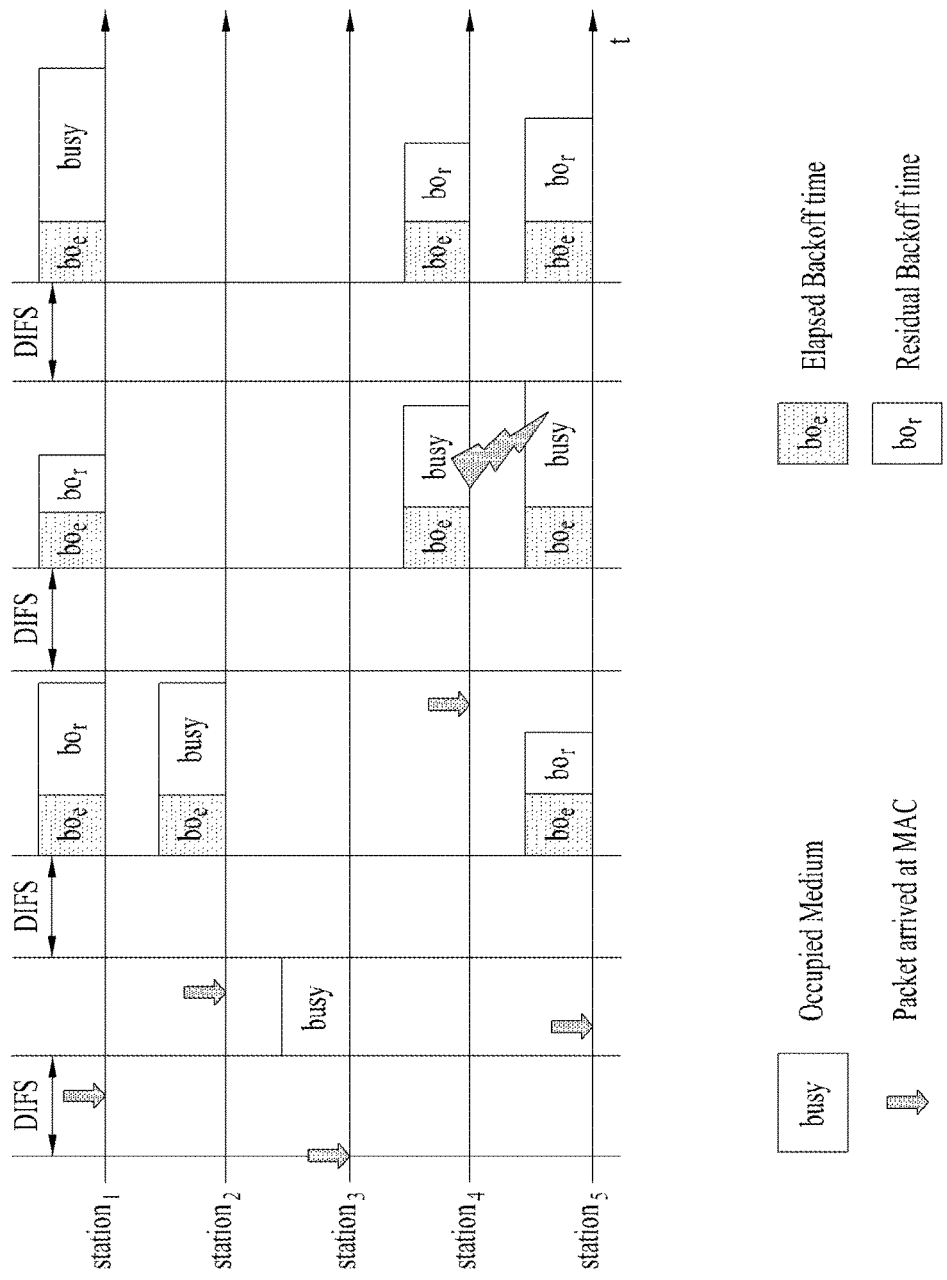
FIG. 6 is a conceptual diagram illustrating a backoff process.

FIG. 6 is a view referred to describing a backoff process.

An operations based on a random backoff period will be described with reference to FIG. 6. If an occupied or busy medium gets idle, a plurality of STAs may attempt to transmit data (or frames). As a method for minimizing collision, each STA may select a random backoff count, wait for a slot time corresponding to the selected backoff count, and then attempt to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which an ACK is not received for the transmission frame). If the CW parameter value reaches CWmax, data transmission may be attempted, maintaining CWmax until data transmission is successful. If the data transmission is successful, the CW parameter value is reset to CWmin. Preferably, CW, CWmin, and CWmax are set to $2^n-1$ (where n=0, 1, 2, . . . ).

Once the random backoff process starts, the STA continuously monitors the medium while counting down the backoff slot according to the determined backoff count value. If the medium is monitored as occupied, the STA discontinues the count-down and waits for a predetermined time. If the medium gets idle, the STA resumes the count-down of the remaining slot time.

In the example of FIG. 6, if a packet to be transmitted to the MAC of STA3 arrives at STA3, STA3 may determine that the medium is idle during a DIFS and immediately transmit a frame. In the meantime, the other STAs monitor the medium as busy and wait for a predetermined time. During the predetermined time, transmission data may be generated in each of STA1, STA2, and STA5. If the medium is monitored as idle, each STA may wait for a DIFS and then count down backoff slots according to a random backoff count value selected by the STA. In the example of FIG. 6, STA2 selects the lowest backoff count value and STA1 selects the highest backoff count value. That is, at the moment when STA2 finishes backoff counting and starts frame transmission, the residual backoff time of STA5 is shorter than the residual backoff time of STA1. Each of STA1 and STA5 temporarily stops countdown while STA2 occupies the medium, and waits for a predetermined time. If STA2 finishes occupying the medium and the medium re-enters the idle state, each of STA1 and STA5 waits for a predetermined time DIFS, and restarts backoff counting. That is, after the remaining backoff slots as long as the residual backoff time are counted down, frame transmission may be started. Since the residual backoff time of STA5 is shorter than that of STA1, STA5 starts frame transmission. Meanwhile, transmission data may be generated in STA4 while STA2 occupies the medium. In this case, if the medium is in the idle state, STA4 waits for a DIFS, performs countdown according to a random backoff count value selected by STA4, and then starts frame transmission. FIG. 6 exemplarily illustrates the case in which the residual backoff time of STA5 coincides with the random backoff count value of STA4. In this case, an unexpected collision may occur between STA4 and STA5. If the collision occurs between STA4 and STA5, each of STA4 and STA5 does not receive an ACK, resulting in failure of data transmission. In this case, each of STA4 and STA5 may double the CW value, select a random backoff count value, and then perform countdown. Meanwhile, STA1 waits for a predetermined time due to transmission of STA4 and STA5 while the medium is in the occupied state. In this case, if the medium is in the idle state, STA1 waits for the DIFS, and then starts frame transmission after lapse of the residual backoff time.

Sensing Operation of STA

As described above, the CSMA/CA mechanism includes not only a physical carrier sensing mechanism in which an AP and/or an STA directly senses the medium, but also a virtual carrier sensing mechanism. The virtual carrier sensing mechanism is used to solve some problems such as a hidden node problem encountered with the medium access. For the virtual carrier sensing, the MAC of the WLAN system may use a Network Allocation Vector (NAV). The NAV indicates a remaining time until the medium is available, indicated to other APs and/or STAs by the AP and/or STA, each of which currently uses the medium or has authority to use the medium. Accordingly, the NAV value corresponds to a reserved time in which the medium will be used by the AP and/or STA configured to transmit the corresponding frame. An STA having received the NAV value defers medium access during the corresponding reserved time. For example, the NAV may be set according to the value of a 'duration' field of the MAC header of the frame.

A robust collision detect mechanism has been introduced to reduce the probability of collision. The robust collision detect mechanism will be described with reference to FIGS. 7 and 8. Although an actual carrier sensing range is different from a transmission range, it is assumed that the actual carrier sensing range is identical to the transmission range for convenience of description.

Figure 7:
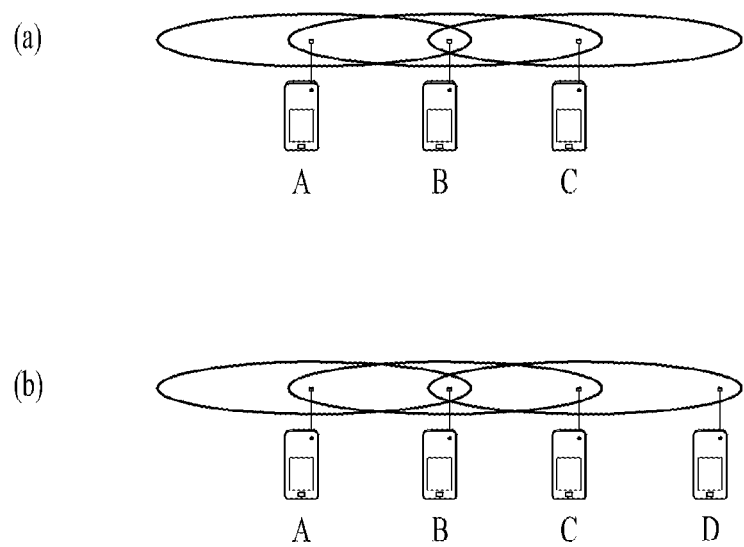
FIG. 7 is a conceptual diagram illustrating a hidden node and an exposed node.

FIG. 7 is a view referred to for describing a hidden node and an exposed node.

FIG. 7(*a*) illustrates an exemplary hidden node. In FIG. 7(*a*), STA A communicates with STA B, and STA C has information to be transmitted. In FIG. 7(*a*), although STA A is transmitting data to STA B, STA C may determine that a medium is idle when performing carrier sensing before transmitting data to STA B. This is because transmission (i.e., medium occupation) of STA A may not be sensed at the location of STA C. In this case, since STA B simultaneously receives information from STA A and STA C, collision occurs. Here, STA A may be considered as a hidden node to STA C.

FIG. 7(*b*) illustrates an exemplary exposed node. In FIG. 7(*b*), while STA B transmits data to STA A, STA C has information to be transmitted to STA D. If STA C performs carrier sensing, it determines that the medium is occupied due to transmission of STA B. Therefore, although STA C has information to be transmitted to STA D, STA C senses the medium as occupied and thus should wait until the medium is idle. However, since STA A is actually located out of the transmission range of STA C, transmission from STA C may not collide with transmission from STA B from the viewpoint of STA A. Thus, STA C unnecessarily waits until STA B stops transmission. Here, STA C may be an exposed node to STA B.

Figure 8:
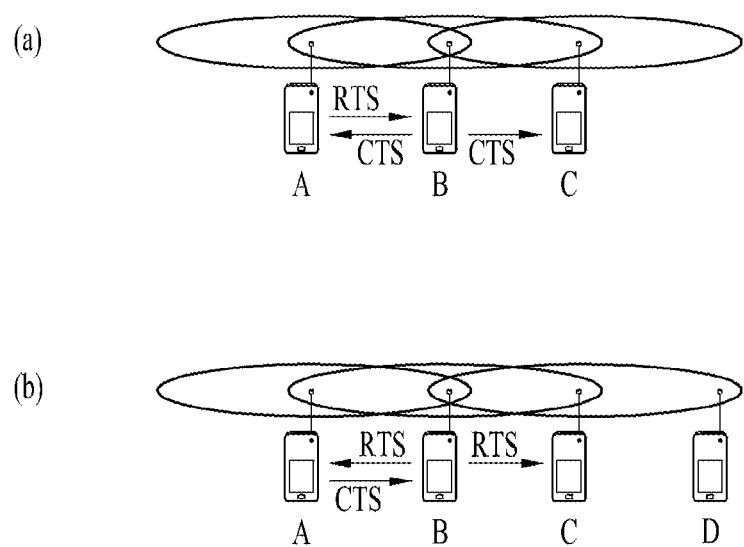
FIG. 8 is a conceptual diagram illustrating RTS (Request To Send) and CTS (Clear To Send).

FIG. 8 is a view referred to for describing Request To Send (RTS) and Clear To Send (CTS).

In order to efficiently utilize the collision avoidance mechanism in the exemplary situation of FIG. 7, a short signaling packet such as RTS and CTS may be used. RTS/CTS between two STAs may be overheard by neighboring STA(s) so that the neighboring STA(s) may consider whether information is transmitted between the two STAs. For example, if an STA that wants to transmit data transmits an RTS frame to a receiving STA, the receiving STA may indicate that it will receive data by transmitting a CTS frame to adjacent STAs.

FIG. 8(*a*) illustrates an exemplary method for solving the hidden node problem. In FIG. 8(*a*), it is assumed that each of STA A and STA C is ready to transmit data to STA B. If STA A transmits an RTS frame to STA B, STA B transmits a CTS frame to its adjacent STAs, STA A and STA C. As a result, STA C should wait until STA A and STA B completely transmit data, thereby avoiding collision.

FIG. 8(*b*) illustrates an exemplary method for solving the exposed node problem. As STA C overhears RTS/CTS transmission between STA A and STA B, STA C may determine that no collision will occur even though it transmits data to another STA (for example, STA D). That is, STA B transmits an RTS frame to all of its adjacent STAs, and only STA A having transmission data may transmit a CTS frame. STA C receives only the RTS frame without receiving the CTS frame from STA A. Therefore, STA A may be aware that it is located outside the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
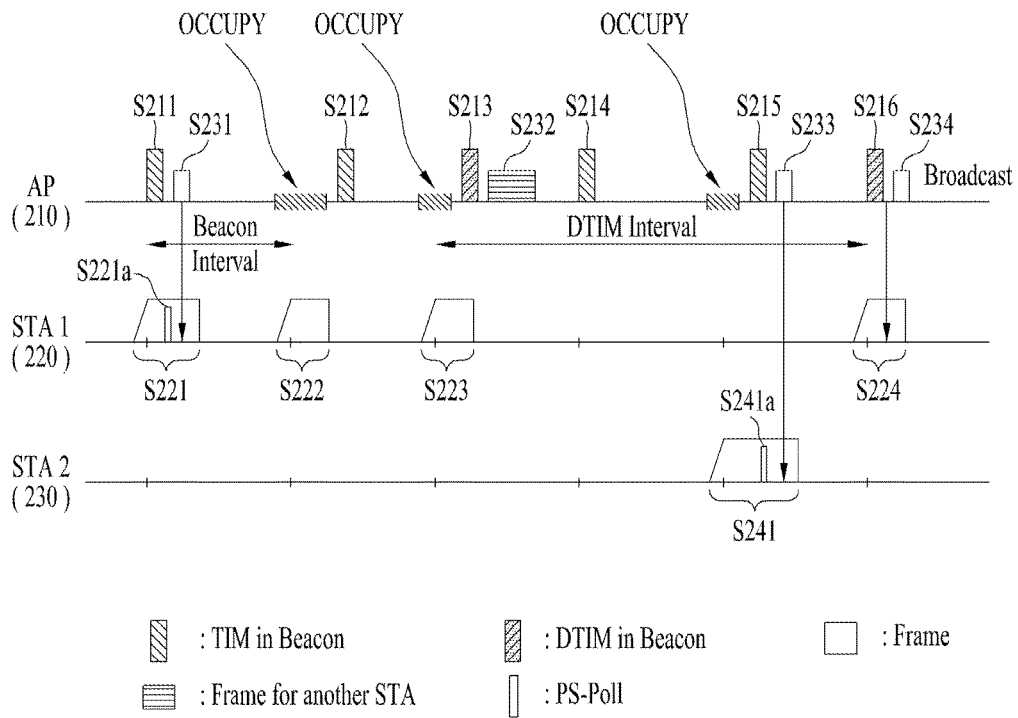
FIG. 9 is a conceptual diagram illustrating a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element denoted by DTIM. During transmission of the third beacon frame, since the busy medium state is given, AP 210 may transmit the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
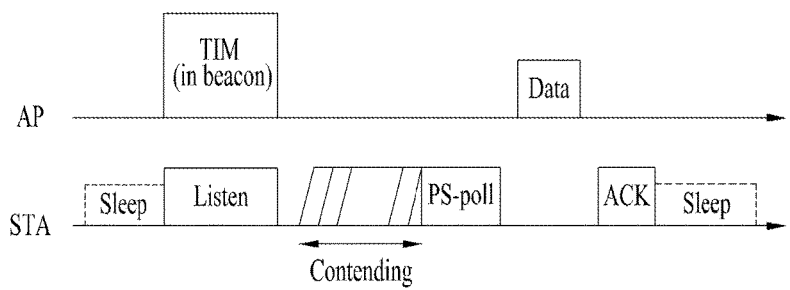
FIGS. 10 to 12 are conceptual diagrams illustrating detailed operations of a station (STA) having received a Traffic Indication Map (TIM).
Figure 11:
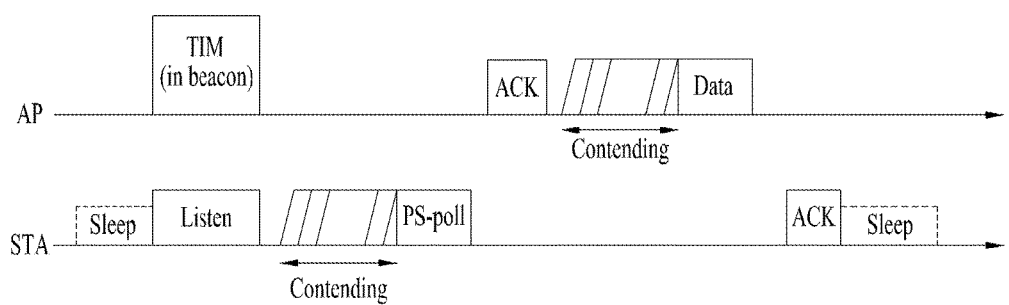
Figure 12:
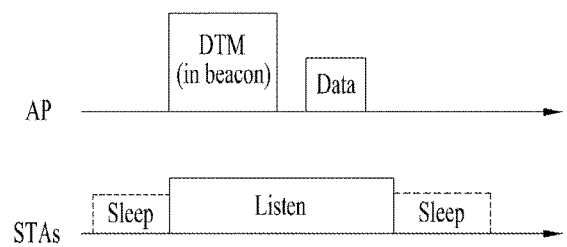

FIGS. 10 to 12 are conceptual diagrams illustrating detailed operations of a station (STA) having received a Traffic Indication Map (TIM).

Referring to FIG. 10, STA is switched from the sleep state to the awake state so as to receive the beacon frame including a TIM from the AP. The STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. The STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, a Short Inter-Frame Space (SIFS)]. In contrast, the AP having received the PS-Poll frame does not prepare a data frame to be transmitted to the STA during the SIFS time, such that the AP may operate according to the deferred response scheme, a detailed description of which will hereinafter be given with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contention. The STA may transmit the ACK frame indicating successful reception of a data frame to the AP, and may then transition to the sleep state.

FIG. 12 shows the exemplary case in which AP transmits a DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintain the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

The AID is used as a unique ID of each STA within one BSS. For example, the AID for use in the current WLAN system may be one of 1 to 2007. In the case of the current WLAN system, 14 bits for the AID may be allocated to a frame transmitted by AP and/or STA. Although the AID value may be assigned a maximum of 16383, the values of 2008 to 16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having reception (Rx) data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or a start point) value. However, although STAs each including the buffered frame are small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, and the remaining parts other than both edge parts are assigned zero (0). If STAs associated with one AP are small in number, inefficiency of bitmap compression does not cause serious problems. However, if the number of STAs associated with one AP increases, such inefficiency may deteriorate overall system throughput.

In order to solve the above-mentioned problems, AIDs may be divided into a plurality of groups such that data can be more efficiently transmitted using the AIDs. A designated group ID (GID) may be allocated to each group. AIDs allocated on the basis of such group will hereinafter be described with reference to FIG. 13.

Figure 13:
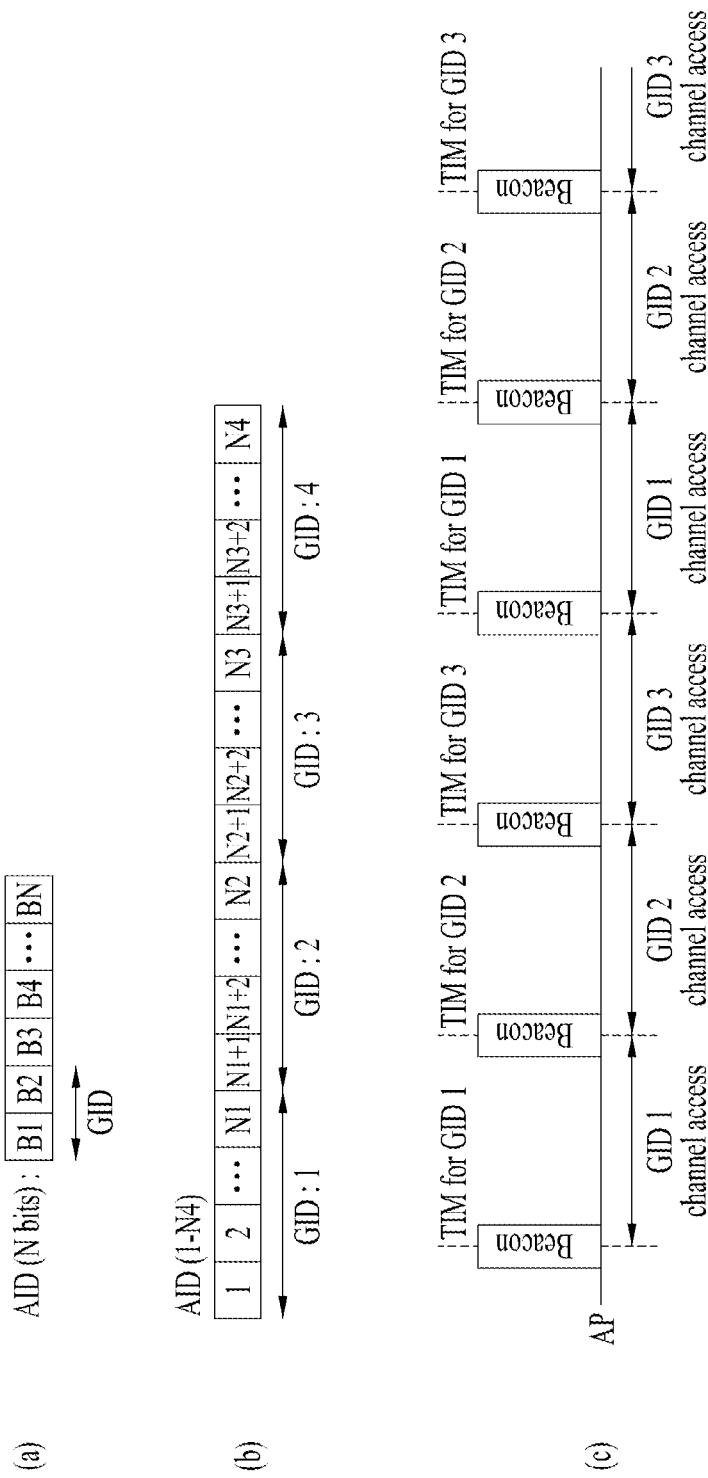
FIG. 13 is a conceptual diagram illustrating a group-based AID.

FIG. 13(*a*) is a conceptual diagram illustrating an example of a group-based AID. In FIG. 13(*a*), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(*b*) is a conceptual diagram illustrating a group-based AID. In FIG. 13(*b*), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(*b*) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. As described above, a predetermined time interval in which access to only allowed to specific STA(s) may be referred to as a restricted access window (RAW).

Channel access based on GID will hereinafter be described with reference to FIG. 13(c). The channel access mechanism according to the beacon interval when AIDs are divided into three groups is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW). A TIM element used only for AIDs having GID 3 is contained in a third beacon frame, such that channel access to an STA corresponding to the AID contained in GID 3 is allowed during a third beacon interval (or a third RAW). A TIM element used only for AIDs each having GID 1 is contained in a fourth beacon frame, such that channel access to an STA corresponding to the AID contained in GID 1 is allowed during a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or each of RAWs subsequent to the fifth beacon interval).

Although FIG. 13(c) exemplarily shows that the order of allowed GIDs is periodic or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (e.g., a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Structure

Figure 14:
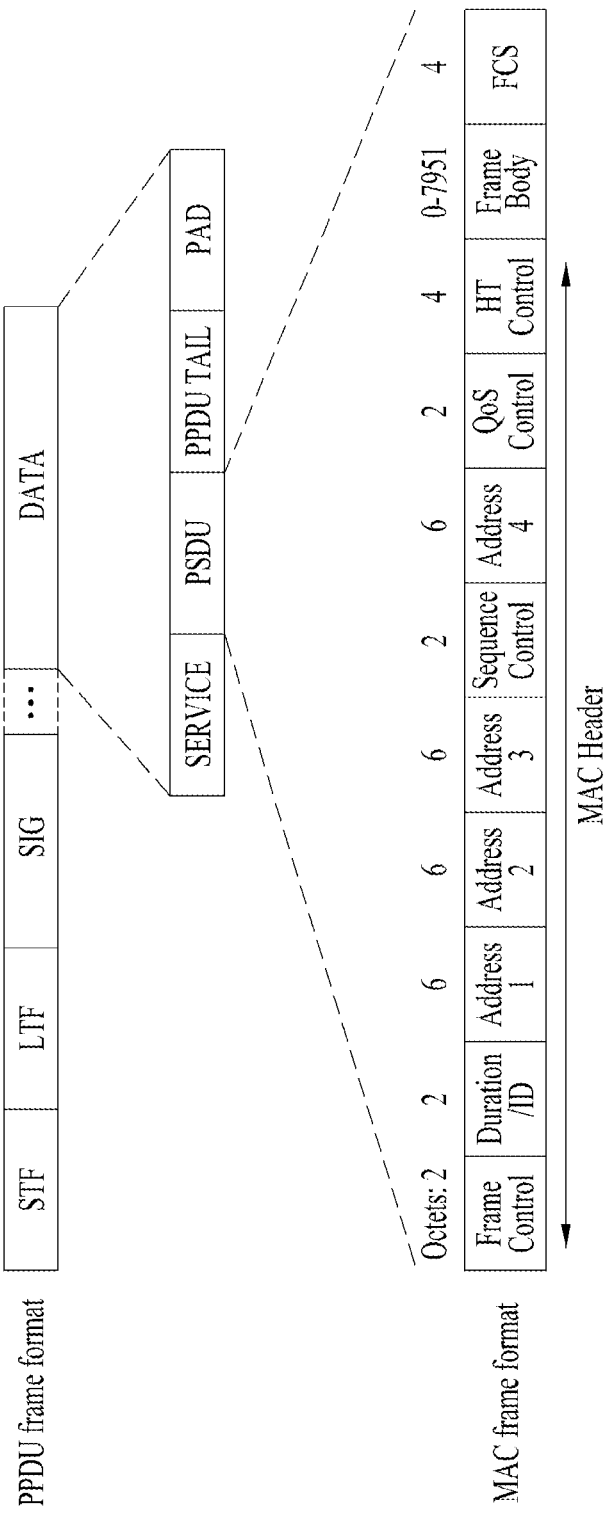
FIG. 14 is a conceptual diagram illustrating a frame structure for use in IEEE 802.11.

FIG. 14 is a diagram for explaining an exemplary frame format used in an 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

A MAC header may include a frame control field, a Duration/ID field, an address field, etc. The frame control field may include control information requisite for frame transmission/reception. The Duration/ID field may be established as a specific time for transmitting the corresponding frame or the like. For a detailed description of Sequence Control, QoS Control, and HT Control sub-fields of the MAC header reference may be made to the IEEE 802.11-2012 standard documentation.

The frame control field of the MAC header may include Protocol Version, Type, Subtype, To DS, From DS, More Fragment, Retry, Power Management, More Data, Protected Frame, and Order sub-fields. For a detailed description of individual sub-fields of the frame control field may refer to the IEEE 802.11-2012 standard documentation.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

APSD Mechanism

An Access Point (AP) supporting Automatic Power Save Delivery (APSD) may perform signaling of information indicating that the AP supports APSD using an APSD subfield contained in a capability information field such as a beacon frame, a probe response frame, or associated response frame (or re-associated response frame). The STA capable of supporting APSD may indicate whether to operate in the active mode or in the PS mode using the power management field contained in the FC field of the frame.

The APSD is a mechanism in which the STA operating in the PS mode can transmit DL data and a bufferable management frame. A power management bit of the FC bit of a frame transmitted by the STA operating in the PS mode employing the APSD is set to 1, such that AP buffering may be triggered.

The APSD defines two delivery mechanisms, i.e., Unscheduled-APSD (U-APSD) and Scheduled-APSD (S-APSD). The STA may use the U-APSD in such a manner that all or some parts of a Bufferable Unit (BU) can be transferred during an unscheduled service period (SP). In addition, the STA may use the S-APSD to deliver some or all parts of the BU during the scheduled SP.

In accordance with the U-APSD mechanism, the STA may inform the AP of a requested transmission duration so as to use U-APSD SP, and the AP may transmit a frame to the STA during the SP. In accordance with the U-APSD mechanism, the SSTA may simultaneously receive several PSDUs from the AP using its own SP.

The STA can recognize the presence of data to be received from the AP through a TIM element of a beacon. Thereafter, the STA transmits a trigger frame to the AP at a desired time so as to inform the AP of the beginning of STA's SP, such that the STA may transmit a data transmission request to the AP. The AP may transmit ACK as a response to the trigger frame. Thereafter, the AP transmits an RTS to the STA through competition, receives a CTS frame from the STA, and transmits data to the STA. In this case, data transferred from the AP may be comprised of one or more data frames. When the AP transmits the last data frame, End Of Service Period (EOSP) of the corresponding data frame is set to 1 and is then transmitted to the STA, the STA may recognize the EOSP of 1 and terminate the SP. Therefore, the STA may transmit an ACK signal indicating successful data reception to the AP. As described above, according to the U-APSD mechanism, the STA may start its own SP at a desired time so as to receive data, and receive multiple data frames within one SP, such that it can more effectively receive data.

The STA configured to use U-APSD may not receive a frame transmitted by the AP during the service period (SP) due to interference. Although the AP may not detect interference, the AP may decide that the STA has incorrectly received the frame. Using U-APSD coexistence capability, the STA may inform the AP of a requested transmission duration, and may use the requested transmission duration as an SP for U-APSD. The AP may transmit the frame during the SP, such that the possibility of receiving the frame can increase under the condition that the STA receives interference. In addition, U-APSD may reduce the possibility that the frame transferred from the AP is not successfully received during the SP.

The STA may transmit an ADDTS (Add Traffic Stream) request frame including a coexistence element to the AP. The U-APSD coexistence element may include information regarding the requested SP.

The AP may process a requested SP and transmit the ADDTS response frame as a response to the ADDTS request frame. The ADDTS request frame may include a status code. The status code may indicate response information of the requested SP. The status code may indicate whether or not the requested SP is allowed, and may further indicate a reason of rejection when the requested SP is rejected.

If the requested SP is allowed by the AP, the AP may transmit the frame to the STA during the SP. The duration time of SP may be specified by the U-APSD coexistence element contained in the ADDTS request frame. The beginning point of SP may be a specific time at which the STA transmits a trigger frame to the AP such that the AP is normally received.

The STA may enter a sleep state (or a doze state) when U-APSD SP expires.

Frame Exchange Method for Low Power STA

STA configured to obtain power by low energy supply source (e.g., a coin-cell battery) may be limited in a manner that the STA can perform the Tx/Rx operations during a specific time interval only. This STA may be referred to as a low power STA or an energy limited STA.

The energy limited STA may have a limited time in which the energy limited STA can maintain the awake state to implement the Tx/Rx operation. A maximum time in which the energy limited STA can maintain the awake state may be referred to as a maximum awake time, a frame exchange sequence (e.g., STA transmits the PS-Poll frame (AP transmits the ACK frame), AP transmits the data frame, and STA transmits the ACK frame, such that all sequences are completed) needs to be completed within the maximum awake time. If a certain STA does not recognize that the counterpart communicating with the certain STA is the energy limited STA, the STA may not maintain the awake state during execution of the frame exchange sequence.

In order to solve this problem, the present invention proposes a method for allowing STA to transmit information regarding the maximum awake time of the STA to the AP. For example, the maximum awake time information of the STA may be contained in a probe request frame, an association request frame, a re-association request frame, etc. that are transferred from STA to AP.

A reference event to which the AP having received the maximum awake time of the STA applies the maximum awake time of the STA can be established as follows.

If data to be transmitted to the STA operating in the power saving (PS) mode occurs, the AP may store the above data in a buffer (a frame stored in a buffer of the AP is referred to as a bufferable unit (BU)), and may await a frame (e.g., PS-Poll frame) for requesting BU transmission from the STA. If the AP receives the above request frame (e.g., PS-Poll frame), this means that the STA is switched to the awake state at the request frame reception time. That is, the AP may transmit the BU to the STA during a maximum awake time from a specific time at which the request frame such as PS-Poll is received from the STA.

Figure 15:
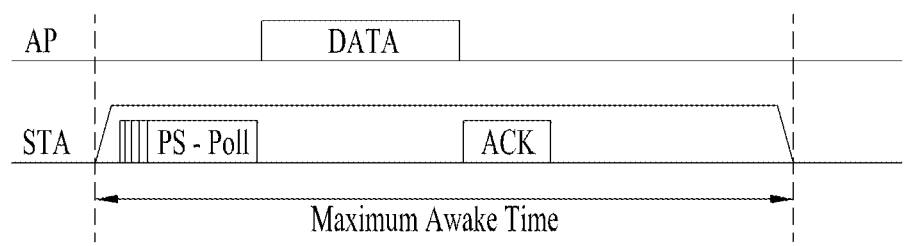
FIG. 15 is a conceptual diagram illustrating one example in which a maximum awake time is applied.

FIG. 15 is a conceptual diagram illustrating one example in which a maximum awake time is applied.

Referring to FIG. 15, after the STA operating in the PS mode is switched from the doze state to the awake state, the STA performs the backoff process. If the backoff timer reaches zero (0), the PS-Poll frame is transmitted to the AP.

The AP having received the PS-Poll frame may transmit the buffered frame (e.g., data frame) for the corresponding STA. Although FIG. 15 exemplarily discloses that the data frame is transmitted as soon as the AP receives the PS-Poll frame (for example, after the SIFS time), it should be noted that the AP receives the PS-Poll frame and transmits the ACK frame to the STA. In addition, the concept shown in FIG. 15 may further include a step of allowing the AP to transmit the ACK frame to the STA after receiving the PS-Poll frame, and a step of transmitting a data frame to the STA after passing through a backoff process.

The STA that receives and correctly decodes the frame, may transmit the ACK frame to the AP. If the AP receives the ACK frame, the frame exchange sequence is terminated. As described above, the frame exchange sequence may be correctly performed within the maximum awake time.

Figure 16:
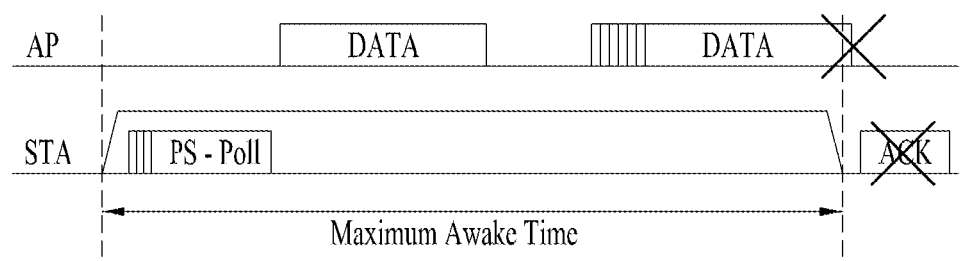
FIG. 16 is a conceptual diagram illustrating another example in which a maximum awake time is applied.

FIG. 16 is a conceptual diagram illustrating another example in which a maximum awake time is applied.

Referring to FIG. 16, after the STA is switched from the doze state to the awake state, the STA may transmit the PS-Poll frame to the AP after passing through the backoff process. The AP having received the PS-Poll frame from the STA may transmit the buffered frame (e.g., data frame) for the corresponding STA, may first transmit the ACK frame, and may transmit the data frame after passing through the backoff process.

In this case, an unexpected error may occur in decoding of the frame transferred from the AP to the STA. In this case, the STA may not transmit the ACK frame to the AP. If the AP having transmitted the data frame to the STA does not receive the ACK frame acting as a response frame from the STA, the AP may perform the exponential backoff process (e.g., a backoff process in which the size of the competition window is doubled). If the backoff timer arrives at zero (0), the AP may transmit (may retransmit) the data frame to the corresponding STA.

FIG. 16 exemplarily illustrates that the frame exchange sequence exceeds the maximum awake time of the STA due to retransmission of data or the like. In this case, the retransmitted data may be incorrectly received by STA, and the STA may not transmit the ACK frame. If the AP transmits the data frame without consideration of the STA maximum awake time, the AP may attempt to retransmit the data frame to be incorrectly received by the STA, resulting in unnecessary resource consumption. In addition, if the data frame is discarded or dropped by the AP due to transmission failure of the data frame, it is impossible for STA to receive the data frame.

In order to address the above-mentioned issues, the following operations are proposed by the present invention.

If the AP does not complete the frame exchange sequence during the STA maximum awake time, the AP may stop downlink (DL) BU transmission to the corresponding STA. In addition, if the AP cannot complete the frame exchange sequence during the STA maximum awake time, and if the AP performs the backoff process (or if the AP performs data transmission), contention parameters (e.g., contention parameter (CW) parameter, etc.) may be initialized. For example, the CW may be initialized to the value of CWmin, and the retransmission count may be initialized to zero.

If the AP stops current transmission due to limitation of the STA maximum awake time, the AP does not drop the frame to be transmitted. If the STA retransmits the PS-Poll frame (e.g., the STA switched to the doze state after lapse of the maximum awake time may reawake and then transmit the PS-Poll frame), the AP may attempt to retransmit the interrupted frame to the corresponding STA.

Figure 17:
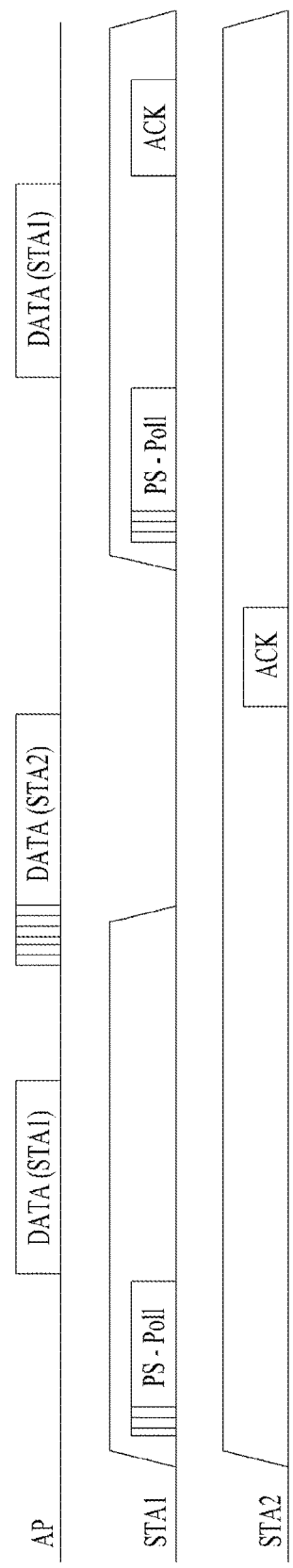
FIG. 17 is a conceptual diagram illustrating operations of the present invention in the case in which a maximum awake time is applied.

FIG. 17 is a conceptual diagram illustrating operations of the present invention in the case in which a maximum awake time is applied.

Referring to FIG. 17, after STA1 switches from the doze state to the awake state, STA1 may transmit the PS-Poll frame to the AP through the backoff process. The AP having received the PS-Poll from the STA1 may transmit the frame (e.g., data frame) buffered for STA1, may first transmit the ACK frame, and may transmit the data frame through the backoff process.

An expected error may occur in decoding of the frame transmitted from AP to STA1. In this case, STA1 may not transmit the ACK frame to the AP. If the AP having transmitted the data frame to STA1 does not receive the ACK frame acting as a response from the STA1, the AP may decide whether retransmission of the data frame can be completed in consideration of the STA maximum awake time. As can be seen from FIG. 17, if retransmission of the data frame cannot be completed within the STA maximum awake time, the AP may not retransmit the data frame to STA1. That is, the AP may stop the current backoff process, and may invoke a new backoff process to transmit the frame to another STA.

As can be seen from FIG. 17, the AP may stop current transmission to STA1, and may invoke the new backoff process for transmitting the data frame to STA2.

Meanwhile, although the backoff process for transmitting the data frame to STA1 is stopped due to limitation of the maximum awake time of STA1, if the corresponding frame is not dropped and the STA1 may retransmit the PS-Poll frame to the AP, the data frame may be transmitted to STA1 in response to the transmitted PS-Poll frame.

Although the above-mentioned examples of the present invention have disclosed the AP operation due to limitation of the STA maximum awake time, the STA may operate according to similar principles.

STA operating in the PS mode performs the backoff process so as to transmit the PS-Poll frame to the AP in the awake state. By carrier sensing or by overheard frames, the residual battery lifespan of the corresponding STA is reduced. During the backoff process, if it is expected that the frame exchange sequence cannot be completed within the maximum awake time on the basis of the STA residual battery lifespan, the STA may stop the backoff process for current transmission. In addition, all contention parameters used in the backoff process for current transmission are initialized by STA. If the STA residual battery lifespan is considered sufficient in a manner that a frame exchange sequence can be achieved within the maximum awake time (e.g., if the battery is recharged with electricity), the new backoff process can be invoked.

STA Timing Synchronization Method

In order to minimize power consumption of the low power STA or the energy limited STA, the low power STA or the energy limited STA may have a longer sleep period than a normal STA. This STA may be referred to as a long sleeper STA.

If the STA sleep period is long, there is a high probability of mismatch of timing synchronization between the AP and the STA.

For example, assuming that a Time Synchronization Function (TSF) timer of STA has accuracy of +/−0.01%, if the STA has a sleep period of 1000 sec, the TSF timer error of the STA is in the range of +/−100 msec.

Assuming that the AP has a beacon interval of 100 msec, if the TSF timer error of the STA is longer than the beacon interval, an unexpected problem occurs in the TIM based PS-mode STA under the above environment. For example, the STA operating in the PS mode can minimize power consumption of the STA. If time synchronization of the corresponding STA is considered inappropriate, it is expected that the STA can receive the beacon frame, such that there is a high possibility that the beacon frame is not received at a specific time at which the STA is switched from the doze state to the awake state. In the worst case, the STA must be maintained in the awake state during a predetermined time corresponding to one beacon interval so as to receive the beacon frame. As described above, if time synchronization is considered inappropriate, STA power consumption may be unavoidably increased.

In order to address the above-mentioned issues, the following operations are proposed by the present invention.

It is assumed that low power STAs are set to low cost devices configured to perform functions, for example, sensor, meter, etc. Most STAs may have low accuracy of the TSF timer and low battery capacity. The above-mentioned method for allowing the low power STA to determine whether wakeup processing is performed through the TIM element of the beacon frame has difficulty in reducing power consumption. As a result, beacon reception is not achieved (this operation mode is referred to as a non-TIM mode). Instead of using the beacon reception, wakeup associated information (e.g., TSF timer) can be more efficiently synchronized using the AP request/response frames (e.g., transmission of a polling frame and reception of a response frame).

For example, in order to inquire of the STA about whether BU for the STA has been buffered in AP, the STA of the doze state is switched to the awake state (or the active state) at a random time, such that the STA can transmit the PS-Poll frame to the AP (This scheme may be referred to as the active polling scheme). The PS-Poll frame may be transmitted at a random time irrespective of the beacon interval of the AP, and the STA may transmit the PS-Poll frame using the CSMA/CA backoff mechanism.

The AP having received the PS-Poll frame from the STA may transmit the ACK frame to the corresponding STA so as to indicate whether or not the BU to be transmitted to the corresponding STA is buffered.

FIG. 18 is a conceptual diagram illustrating exemplary formats of a PS-Poll frame and an ACK frame according to an embodiment of the present invention.

FIG. 18($a$) illustrates an exemplary format of the PS-Poll frame.

The frame control field of the PS-Poll frame and the Frame Check Sequence (FCS) will hereinafter be described in detail with reference to FIG. 14.

The AID field of the PS-Poll frame may be set to an AID value allocated by the AP using the STA having transmitted the PS-Poll frame. The RA field is a receiver address. The PS-Poll frame is transmitted from the STA to the AP, such that the RA field is set to a MAC address (i.e., BSSID value) of the AP. The TA field is a transmitter address, and is set to the MAC address value of the STA configured to transmit the PS-Poll frame.

FIG. 18($b$) illustrates exemplary formats of the ACK frame.

The frame control field of the ACK frame may include a More Data (MD) sub-field.

If the BU to be transmitted to the STA having transmitted the PS-Poll frame is not present, the MS sub-field of the frame control field of the ACK frame may be set to zero (0). If the BU to be transmitted to the corresponding STA is present, the MD sub-field of the frame control field of the ACK frame may be set to 1.

The frame control field and the FCS of the ACK frame will refer to those of FIG. 14.

The duration field of the ACK frame may be used to establish a NAV of a $3^{rd}$ party STA (i.e., other STA(s) excluding the destination STA of the ACK frame) receiving the ACK frame). The duration field of the ACK frame may be set to a specific value having a transmission time of a subsequent frame to be protected after lapse of the ACK frame.

The RA field of the ACK frame may be set to the MAC address value of the STA having transmitted the PS-Poll frame.

If the AP desires to perform synchronization of the TSF timer of the STA, the ACK frame may be transmitted in the form shown in FIG. 18($c$). The items proposed by the present invention may include information regarding the TSF timer in the ACK frame transmitted from the AP to the STA. That is, the frame format of FIG. 18($c$) is only exemplary of the ACK frame format, and the ACK frame format proposed by the present invention is not limited to the control wrapper frame format shown in FIG. 18($c$).

The control wrapper frame shown in FIG. 18($c$) may be used to include additional information into other control frames (e.g., RTS frame, CTS frame, ACK frame, etc.). In accordance with the present invention, the frame shown in FIG. 18($c$) may be referred to as an extended ACK frame.

The frame control field and the FCS of the extended ACK frame will refer to those of FIG. 14.

The duration field of the extended ACK frame may be used to establish the NAV of the $3^{rd}$ party STAs having received the corresponding frame, and may be set to a specific value including a transmission time of a subsequent frame to be protected after lapse of the extended ACK frame.

"Address 1" field of the extended ACK frame may be set to an address value of the STA having received the corresponding frame.

The Carried Frame Control accompanying the extended ACK frame may be set to the frame control field of the control frame (e.g., ACK frame) that is encapsulated by the extended ACK frame and then transmitted.

The TSF timer field of the extended ACK frame is used to perform synchronization of the TSF timer of the STA having received the corresponding frame, and some parts of the TSF timer of the device (e.g., AP) configured to transmit the extended ACK frame are included in the TSF timer field. For example, some parts of the TSF timer may correspond to 4 lower bytes (e.g., 4 least significant bytes (LSBs)) of the TSF timer. These parts may be referred to as partial timestamp information. Although the AP provides only some parts of the TSF timer, the AP can correct the TSF timer of the STA, a method for providing only some parts of the TSF timer may be considered more efficient so as to reduce signaling overhead. For example, although there occurs an error of the TSF timer values between the AP and the STA, a great or high error causing change of upper bytes (Most Significant Byte (MSB)) of the TSF timer rarely occurs. Therefore, only some parts (e.g., some LSBs) of the TSF timer value are provided such that signaling overhead can be reduced and the TSF timer error can be correctly synchronized.

The Carrier Frame field of the extended ACK frame may be established to be identical to the remaining fields excluding the frame control field of the control frame (e.g., ACK frame) that is encapsulated by the extended ACK frame and then transmitted.

A method for synchronizing the TSF timer of the long sleeper STA using the extended ACK frame shown in FIG. 18($c$) can be carried out according to the following examples.

For example, if the long sleeper STA staying in the sleep mode for at least 10 minutes awakes, the STA may not listen to the beacon and may then transmit the PS-Poll frame to the AP. After that, the AP may transmit the ACK frame (or the extended ACK frame) in response to the PS-Poll frame.

If it is necessary for the AP having received the PS-Poll frame to synchronize the TSF timer of the long sleeper STA with its own TSF timer, the AP may answer the STA using the ACK frame (e.g., the extended ACK frame of FIG. 18(*c*)) including TSF timer information (e.g., some lower bytes of the TSF timer of the AP).

The STA having received TSF timer information (or some parts of the TSF timer of the AP) from the AP may correct its own TSF timer according to the TSF timer information of the AP.

In this case, the method for allowing the AP to perform TSF timer synchronization using the extended ACK frame may response to a direct request signal for providing TSF timer information, which is transferred from the long sleeper STA to the AP. For this purpose, if a specific bit (e.g., an order bit of the frame control field) of the PS-Poll frame transmitted from the long sleeper STA is set to a specific value (e.g., 1), this means that the corresponding STA may ask the AP to provide TSF timer information. If the specific bit of the PS-Poll frame is set to zero (0), this means that the corresponding STA does not request TSF timer information provision from the AP.

Figure 19:
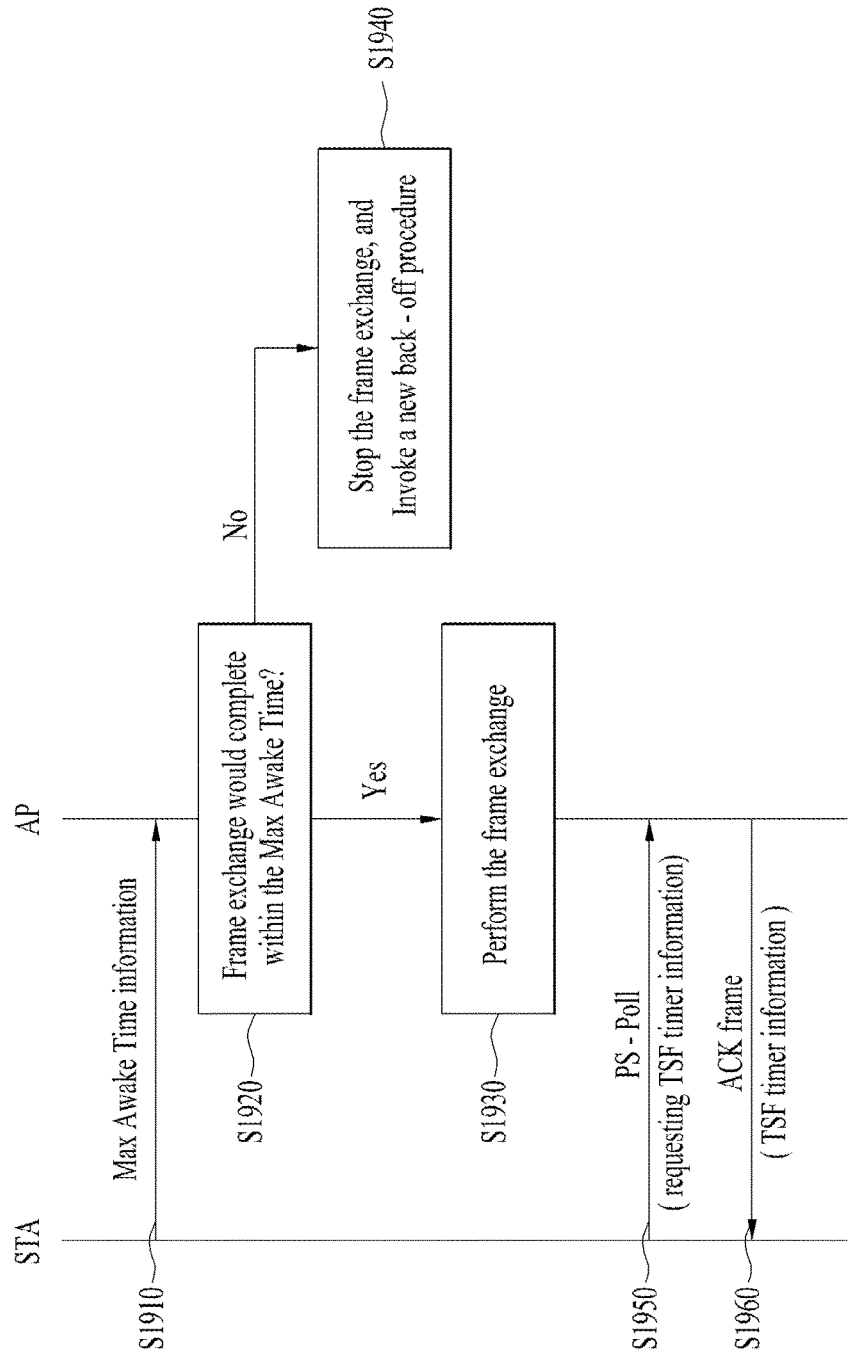
FIG. 19 is a flowchart illustrating a method for performing frame exchange according to an embodiment of the present invention.

FIG. 19 is a flowchart illustrating a method for performing frame exchange according to an embodiment of the present invention.

Referring to FIG. 19, STA may transmit the maximum awake time information to the AP in step S1910. The maximum awake time information may be transmitted through one of the probe request frame, the association request frame, and the reassociation request frame.

In step S1920, the AP may determine whether frame exchange with the STA will be completed within the STA maximum awake time. Alternatively, the AP may determine whether frame exchange with the STA will exceed the maximum awake time. In this case, the maximum awake time may determine whether frame exchange will be completed within the maximum awake time on the assumption that the maximum awake time starts from a specific time at which the AP receives the PS-Poll frame or the like from the STA.

If the result of step S1920 is denoted by YES, frame exchange is carried out in step S1930.

If the result of step S1920 is denoted by NO, step S1940 is carried out. In step S1940, the SP may stop a current frame exchange or backoff process, and may invoke the new backoff process for new transmission. In this case, the backoff parameter (e.g., contention parameters) may be initialized as necessary.

Meanwhile, if frame exchange is performed in step S1930, the frame exchange step may include a step of transmitting the PS-Poll frame from the STA to the AP, a step of transmitting the ACK frame from the AP to the STA, a step of transmitting the data frame from the AP to the STA, and other steps.

In step S1950, the STA may transmit the PS-Poll frame to the AP. In this case, a method for allowing the STA to request TSF timer information of the AP (or requesting of TSF timer synchronization) using a specific bit of the PS-Poll frame may be indicated.

In step S1960, the AP may transmit the ACK frame (or the extended ACK frame) to the STA in response to the PS-Poll frame. In this case, the ACK frame (or the extended ACK frame) may include TSF timer information of the AP. Specifically, the TSF timer information may include some parts (e.g., some lower bytes) of the TSF timer information.

In addition, the scope or spirit of steps S1950 and S1960 is not limited to execution within the maximum awake time, and steps S1950 and S1960 may be applied to the scheme (i.e., active polling scheme) for transmitting the polling message without listening to the beacon by the awaked STA.

Although the exemplary method shown in FIG. 19 is represented by a series of operations for clarity of description, this method is not used to limit the execution order of steps, and individual steps may be performed at the same time or in different orders as necessary. In addition, all steps shown in FIG. 19 are not always needed to implement the method proposed by the present invention.

In accordance with the above-mentioned method shown in FIG. 19, various embodiments of the present invention are performed independently or two or more embodiments of the present invention are performed simultaneously.

Figure 20:
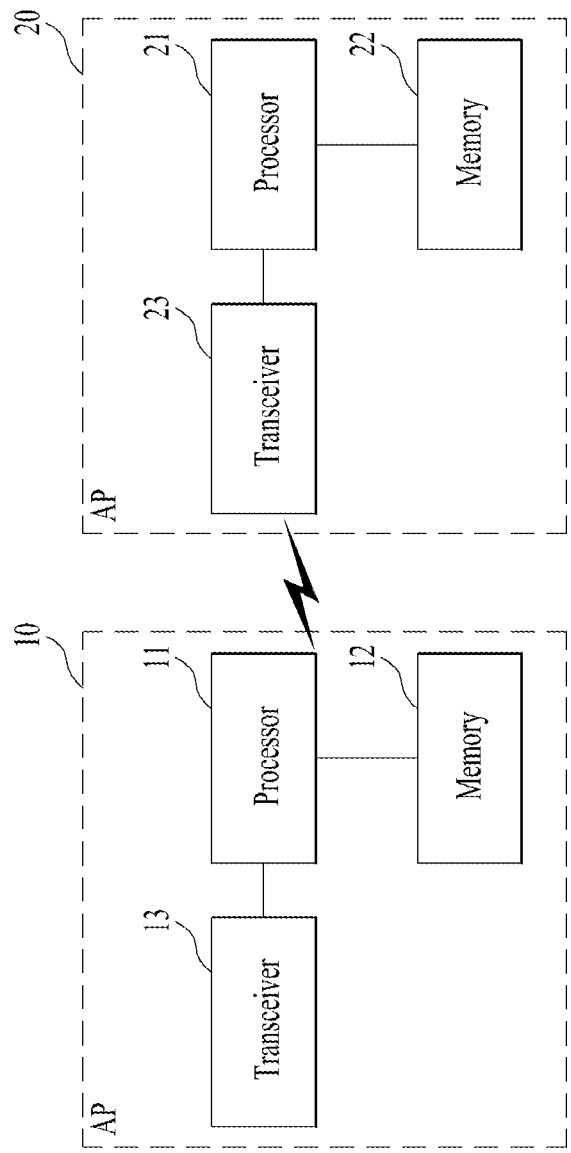
FIG. 20 is a block diagram illustrating a radio frequency (RF) device according to an embodiment of the present invention.

FIG. 20 is a block diagram illustrating a radio frequency (RF) device according to an embodiment of the present invention.

Referring to FIG. 20, an AP 10 may include a processor 11, a memory 12, and a transceiver 13. An STA 20 may include a processor 21, a memory 22, and a transceiver 13. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 can be configured to perform operations according to the above-described embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

In FIG. 20, the AP 10 may be established to exchange a frame with the STA 20. The processor 11 may control the transceiver 13 to receive information regarding the maximum awake time from the STA 20. In addition, if it is expected that frame exchange will be completed within the maximum awake time, the processor 11 may be established to perform the above frame exchange. In addition, if it is expected that the frame exchange will exceed the maximum awake time, the processor 11 may stop the above frame exchange and may perform the new backoff process.

In addition, the AP 10 shown in FIG. 20 may be established to perform TSF timer synchronization with the STA 20. The processor 11 may control the transceiver 13 to receive the PS-Poll frame including specific indication information that requests information about some parts of the TSF timer, from the STA 20. In addition, the processor 11 may control the transceiver 13 to transmit information about some parts of the TSF timer to the STA 20 through the ACK frame (or the extended ACK frame).

Meanwhile, the STA 20 shown in FIG. 20 may be established to perform frame exchange with the AP 10. The processor 21 may control the transceiver 23 to transmit information about the maximum awake time to the AP 10. Therefore, if it is expected that frame exchange will be completed within the maximum awake time, the frame exchange may be carried out. Alternatively, if it is expected that frame exchange will exceed the maximum awake time, frame exchange will be stopped and the new backoff process can be carried out.

In addition, the STA 20 shown in FIG. 20 may be established to perform TSF timer synchronization with the AP 10. The processor 21 may control the transceiver 23 to transmit the PS-Poll frame including specific indication information that requests information about some parts of the TSF timer, to the AP 10. In addition, the processor 21 may control the transceiver 23 to receive information about some parts of the TSF timer from the AP 10 through the ACK frame (or the extended ACK frame).

The specific configuration of the AP 10 and STA 20 may be implemented such that the various embodiments of the present invention are performed independently or two or more embodiments of the present invention are performed simultaneously. Redundant matters will not be described herein for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based upon an IEEE 802.11 system, the embodiments may be applied in the same manner to various mobile communication systems.

What is claimed is:

1. A method for allowing an access point (AP) to perform frame exchange with a station (STA) in a wireless Local Area Network (WLAN) system, comprising:
   receiving, from the STA, information regarding a maximum awake time that is limited by an energy supply of the STA;
   when it is expected that the frame exchange will be completed within the maximum awake time limited by the energy supply of the STA, performing the frame exchange; and
   when it is expected that the frame exchange will exceed the maximum awake time limited by the energy supply of the STA, stopping the frame exchange, and performing a new backoff process,
   wherein the new backoff process is invoked after completion of energy recovery for the energy supply of the STA, and
   wherein the frame exchange includes:
   receiving, from the STA, a PS (Power Save)-Poll frame (PS-Poll) frame including information indicating that information regarding a predetermined number of lower bytes of a Time Synchronization Function (TSF) timer of the AP is requested; and
   transmitting, to the STA, an acknowledge (ACK) frame.

2. The method according to claim 1, wherein the AP assumes that the maximum awake time starts from a specific time at which the access point (AP) receives the (PS-Poll) frame from the station (STA).

3. The method according to claim 1, wherein the information regarding the maximum awake time is received from the station (STA) by the access point (AP) through a probe request frame, an association request frame, or a reassociation request frame.

4. The method according to claim 1, wherein the ACK frame includes the information regarding the predetermined number of lower bytes of the TSF timer of the AP.

5. The method according to claim 1, wherein the PS-Poll frame is received when the STA awakes.

6. The method according to claim 1, wherein the PS-Poll frame is received on a condition that the STA does not listen to a beacon.

7. A method for allowing a station (STA) to perform frame exchange with an access point (AP) in a wireless Local Area Network (WLAN) system, comprising:
   transmitting, to the AP, information regarding a maximum awake time that is limited by an energy supply of the STA;
   when it is expected that the frame exchange will be completed within the maximum awake time limited by the energy supply of the STA, performing the frame exchange; and
   when it is expected that the frame exchange will exceed the maximum awake time limited by the energy supply of the STA, stopping the frame exchange, and performing a new backoff process,
   wherein the new backoff process is invoked after completion of energy recovery for the energy supply of the STA, and
   wherein the frame exchange includes:
   transmitting, to the AP, a PS (Power Save)-Poll frame (PS-Poll) frame including information indicating that information regarding a predetermined number of lower bytes of a Time Synchronization Function (TSF) timer of the AP is requested; and
   receiving, from the AP, an acknowledge (ACK) frame.

8. An access point (AP) for performing frame exchange with a station (STA) in a wireless Local Area Network (WLAN) system comprising: a transceiver; and a processor, wherein the processor:
   controls the transceiver to receive, from the STA, information regarding a maximum awake time that is limited by an energy supply of the STA;
   when it is expected that the frame exchange will be completed within the maximum awake time limited by the energy supply of the STA, performs the frame exchange; and when it is expected that the frame exchange will exceed the maximum awake time limited by the energy supply of the STA, stops the frame exchange, and performs a new backoff process, and wherein the new backoff process is invoked after completion of energy recovery for the energy supply of the STA, and wherein in the frame exchange, the processor controls the transceiver to receive, from the STA, a PS (Power Save)-Poll frame (PS-Poll) frame including information indicating that information regarding a predetermined number of lower bytes of a Time Synchronization Function (TSF) timer of the AP is requested, and to transmit, to the STA, an acknowledge (ACK) frame.

9. A station (STA) for performing frame exchange with an access point (AP) in a wireless Local Area Network (WLAN) system, comprising: an energy supply; a transceiver; and a processor, wherein the processor:

controls the transceiver to transmit, to the AP, information regarding a maximum awake time that is limited by the energy supply of the STA;

when it is expected that the frame exchange will be completed within the maximum awake time limited by the energy supply of the STA, performs the frame exchange; and when it is expected that the frame exchange will exceed the maximum awake time limited by the energy supply of the STA, stops the frame exchange, and performs a new backoff process, and wherein the new backoff process is invoked after completion of energy recovery for the energy supply of the STA, and wherein in the frame exchange, the processor controls the transceiver to transmit, to the AP, a PS (Power Save)-Poll frame (PS-Poll) frame including information indicating that information regarding a predetermined number of lower bytes of a Time Synchronization Function (TSF) timer of the AP is requested and to receive, from the AP, an acknowledge (ACK) frame.

* * * * *